United States Patent [19]

Semmler

[11] Patent Number: 5,757,631
[45] Date of Patent: May 26, 1998

[54] CONVERTER APPARATUS WITH REVERSIBLE DRIVING OF A SWITCHING TRANSISTOR

[75] Inventor: Peter Semmler, Moosburg, Germany

[73] Assignee: Siemens Aktiengesellschaft, Munich, Germany

[21] Appl. No.: 667,942

[22] Filed: Jun. 24, 1996

[30] Foreign Application Priority Data

Jun. 23, 1995 [DE] Germany .................... 195 22 956.8

[51] Int. Cl.[6] .................... H02M 1/12; H02M 3/335; H02M 3/24
[52] U.S. Cl. .................... 363/41; 363/21; 363/97
[58] Field of Search .................... 363/163, 165, 363/164, 20, 21, 41, 97

[56] References Cited

U.S. PATENT DOCUMENTS

| | | | |
|---|---|---|---|
| 3,906,331 | 9/1975 | Hamilton et al. | 321/2 |
| 4,355,277 | 10/1982 | Davis et al. | 323/222 |
| 4,446,440 | 5/1984 | Bell | 330/10 |
| 4,628,426 | 12/1986 | Steigerwald | 363/21 |
| 4,772,995 | 9/1988 | Gautherin et al. | |
| 4,835,669 | 5/1989 | Hancock et al. | 363/21 |
| 4,849,869 | 7/1989 | Tanuma et al. | 363/21 |
| 4,884,183 | 11/1989 | Sable | 363/41 |
| 4,904,919 | 2/1990 | McNaughton | 318/798 |
| 5,408,402 | 4/1995 | Nonneumacher | |

FOREIGN PATENT DOCUMENTS 28 38 009  1/1980  Germany.

*Primary Examiner*—Peter S. Wong
*Assistant Examiner*—Bao Q. Vu
*Attorney, Agent, or Firm*—Hill & Simpson

[57] ABSTRACT

A converter apparatus that is operated with a pulse-width modulated drive signal with constant in the normal operating case and is operated with a frequency-modulated drive signal with constant pulse width in case of overload or, respectively, light load.

5 Claims, 6 Drawing Sheets

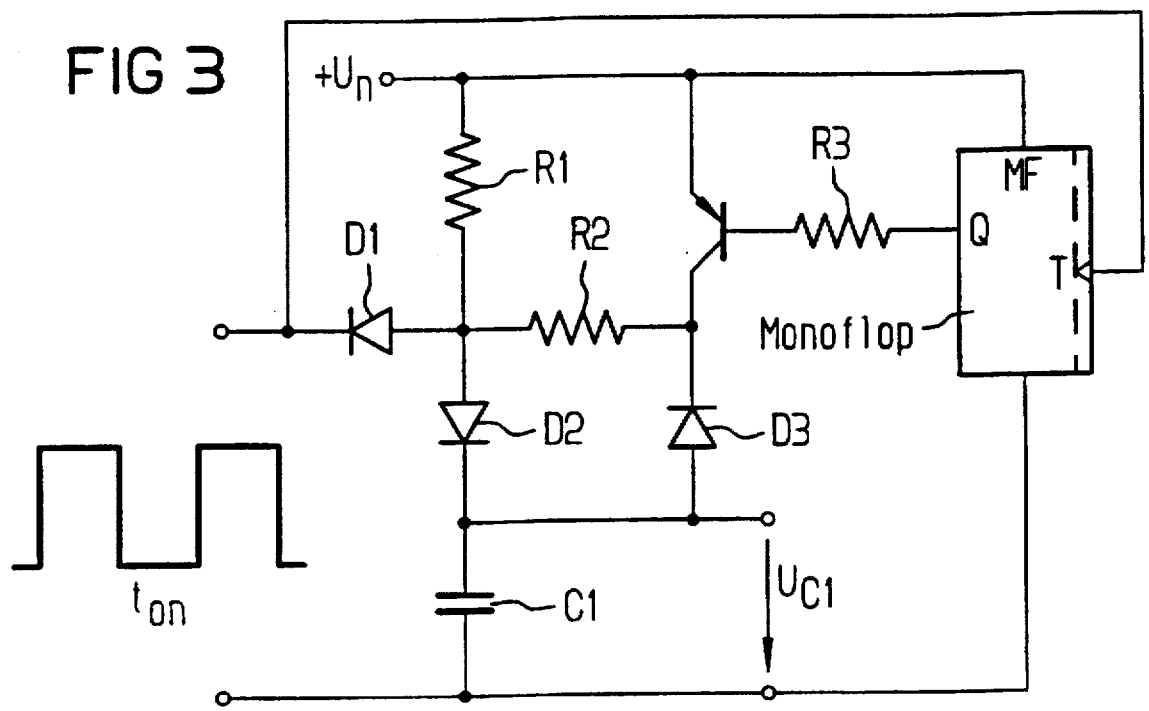
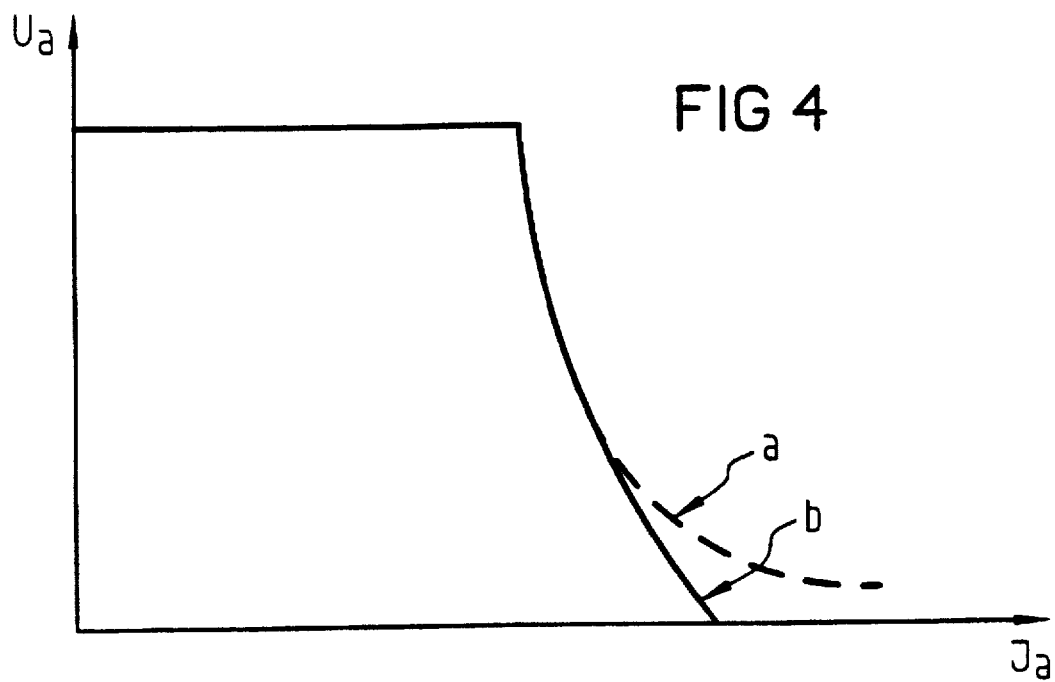

5,757,631

CONVERTER APPARATUS WITH REVERSIBLE DRIVING OF A SWITCHING TRANSISTOR

BACKGROUND OF THE INVENTION

1. Field of the Invention

The present invention relates generally to frequency converters and in particular to a converter apparatus that is operated with a pulse-width modulated drive signal with constant frequency in a normal operating situation and a frequency-modulated drive signal with constant pulse-width in case of an overload or a light load situation.

2. Description of the Related Art

Pulse width-modulated converters, particularly D.C. frequency converters work with a constant operating frequency in normal operation. The regulation of the output voltage of the converter occurs by modifying the pulse-duty ratio $t_{on}/T$ of the drive signal for the electronic switch of the converter. In order to obtain a constant voltage at the output posts of the converter, this ratio, for example, is compared to a predetermined rated voltage value in an error amplifier. Given a deviation from the rated voltage value, the error amplifier thereby forwards the amplified repetitive error to a control input of the pulse-width modulator. Corresponding to the size of the amplified repetitive error, this regulates the pulse-duty ratio $t_{on}/T$ of the drive signal for the electronic switch adjacent at the output of the pulse-width modulator.

In case of overload, when the user connected to the output side of the converter becomes low-impedance, a current-limiting circuit effects a reduction of the pulse-duty ratio of the electronic switch of the converter. This current-limiting circuit measures the current flowing in the primary circuit of the converter via, for example, a shunt (precision resistor) and prematurely switches the electronic switch off after a critical current threshold has been reached. The measurement of the primary current and the shut-off of the electronic switch, however, is affected by a delay time. The delay time is composed of, for example, the switching times within a comparison unit, the signal running time in the control IC, the time in which the output signal for the electronic switch is reset, and the switching time that the electronic switch requires until it interrupts the primary circuit after the arrival of the shut-off signal. When these signal delay times, which are largely conditioned by circuitry are added, the minimum possible turn-on time $t_{onmin}$ for the frequency converter is provided. Since the output voltage of the converter is determined by the relationship $t_{on}/T$, it follows therefrom that the turn-on time $t_{on}$ of the electronic switch must approach zero given a low-impedance short. Since this, however, is not possible due to the signal delay times, the output current begins to rise steeply given a low-impedance short. This short-circuit current, that can destroy the electronic switch or the rectifiers under certain circumstances, is more pronounced with converters with high output voltage, high efficiency and a high operating frequency.

When the converter is operated at light load, then the pulse-duty factor $t_{on}/T$ must likewise be greatly reduced since the transmitted power of the system is greater than the power required of the converter as the circuit output. With a given cycle duration T, a shorter turn-on time $t_{on}$ of the electronic switch that is shorter than the minimum possible turn-on time $t_{onmin}$ of the electronic switch of the converter is then required in no-load operation. When the output voltage of the converter lies above a predetermined rated voltage value, the error amplifier also impedes the electronic switch from switching again. An activation of the electronic switch only occurs when the output voltage has again dropped below the rated voltage value and it is again enabled by the error amplifier. Such a circuit embodiment of a converter is disclosed, for example, in German Patent DE 28 38 009.

The afore-mentioned problems do not occur in a converter with constant $t_{on}$ and variable frequency. A disadvantage of such an embodiment of a converter, however, is that the operating frequency of the converter is adapted corresponding to the load conditions at the output terminal posts over the entire load range between no-load and short-circuit operation. Due to the different operating frequencies, it is not possible to synchronize a plurality of converters with one another.

Given a voltage supply unit with a plurality of output voltages, a plurality of converters are dimensioned for the corresponding output voltages under certain circumstances. For circuit-oriented reasons, the specifically dimensioned converters are synchronized with one another to obtain advantages of a uniform switching frequency. The alternating current load on the intermediate circuit capacitors is reduced by a suitable phase selection of the converters operated, for example, push-pull.

A common interference filter can be used with synchronized converters. When the converters are not operated synchronized, then the operating frequencies of the individual converters differ slightly due to the unavoidable tolerances. This difference in the operating frequency acts on the common voltage supply of the converter circuits as beats. Since the reactions onto the voltage supply are subject to specific, defined limit values, interfering frequencies must be kept away from the supply leads with correspondingly dimensioned filters. Since the beat frequency corresponds to the difference frequencies of the individual converters, the possible frequency spectrum begins at 0 volts. As a result, a filter cannot be properly dimensioned. The converters would have to be individually shielded given unsynchronized operation.

SUMMARY OF THE INVENTION

An object of the present invention is to provide a converter device that can be operated with variable frequency in a light load or overload condition and can be operated with a constant operating frequency in a normal operating condition.

An advantage of the present invention is that the converter works with constant frequency in the normal operating case and can be synchronized with other converters. The pulse-duty factor in the light load or overload case is modified by a new cycle duration and the operating frequency is thus reduced in the light load and overload case and a further rise of the output voltage or the short-circuit current is prevented.

In the inventive circuit arrangement, the advantages of a variable-frequency converter in the light load and overload case are combined with the advantages of a constant-frequency converter operated with pulse-width modulation. In the normal operating case, the converter works like a converter with constant frequency and can be synchronized with other converters. In the overload or light load case, the converter retains its minimum turn-on time $t_{onmin}$ but modifies the operating frequency corresponding to the current or voltage conditions. In case of error that arises, for example, given load shedding or short-circuit, the clock generator (VCO) is supplied with a setting signal, as a result whereof it varies the clock frequency until a stationary operating condition is restored. An inadmissibly high output current in case of overload as well as a packet drive in case of light load is thereby effectively suppressed. Given synchronously operating converters, the converter at which the error occurred is decoupled from the others until a normal operating condition has been restored.

Further characteristics of the invention may be derived from the following detailed explanation of an exemplary embodiment with reference to drawings.

BRIEF DESCRIPTION OF THE DRAWINGS

FIG. 3 is a block circuit diagram of the detector circuit of the present invention.

FIG. 4 is a graphical diagram illustrating the functioning of the detector circuit.

DETAILED DESCRIPTION OF THE PREFERRED EMBODIMENT

Figure 1:
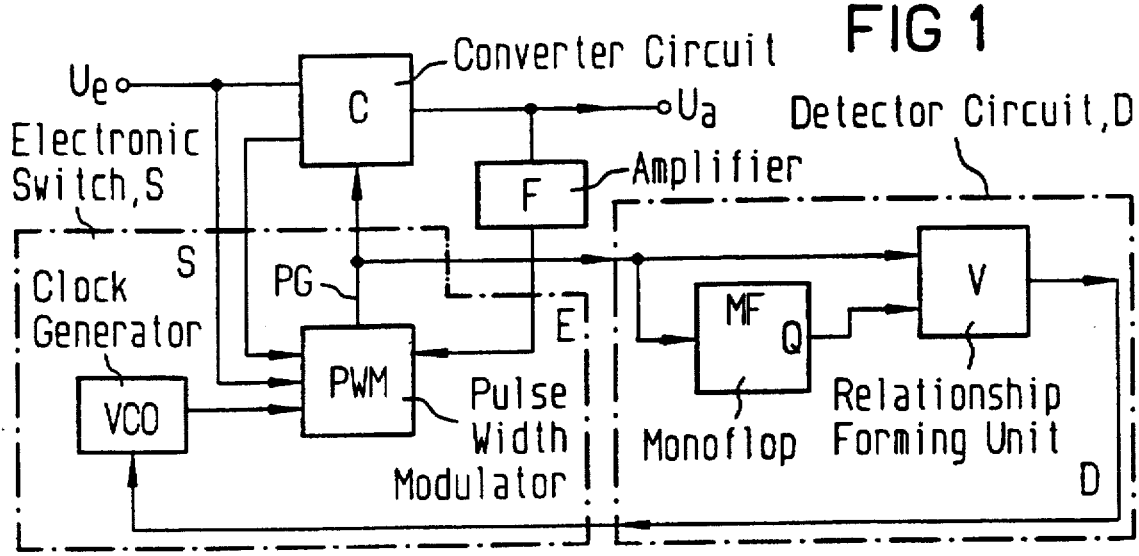
FIG. 1 is a block circuit diagram of an embodiment of the converter apparatus of the present invention.

FIG. 1 shows a circuit arrangement shown in block circuit diagram of a converter. This converter is essentially composed of the circuit module of a converter C, a pulse-width modulator PWM, an error amplifier F, a clock generator with variable frequency (VCO), and a detector circuit D. The detector circuit D recognizes a short-circuit or overload and correspondingly provides an output signal to regulate the frequency of the clock generator (VCO) via the output signal.

A monostable circuit (monoflop) MF dimensioned to a definable turn-on time $t_{onmin*}$ as well as a relationship forming unit V are essentially provided in the detector circuit D. Adjacent to the terminal posts of the relationship forming element V are the output signal of the monoflop MF at a first input and the drive signal of an electronic switch S at a second input. The relationship forming unit V serves the purpose of forming the relationship between the on duration of the drive signal $t_{on}$ to the on duration $t_{onmin*}$ of the output signal of the monoflop MF. This "relationship formation" is achieved by a synchronous averaging of the aforementioned signals.

The pulse-width modulator PWM is influenced via a current flowing at the primary side in a precision resistor of the main circuit and via an output voltage adjacent at the converter at the secondary side. The output signal of the pulse-width modulator PWM defines the pulse-duty factor of the electronic switch of the converter circuit C. This output signal adjacent at the output posts PG of the pulse-width modulator PWM is connected to the input of the detector circuit D. The pulse width of the PWM output signal is influenced by the measured values calculated at the primary or secondary side of a transformer of the converter.

The monoflop MF arranged in the detector circuit D is triggered with the drive signal $t_{on}$ for the electronic switch.

The monoflop MF generates a defined time window for the synchronous averaging. The pulse length of the output signal of the monoflop $t_{onmin*}$ determines the turn-on time from which the converter operates in a modulated manner.

An analog setting signal $U_{c1}$ (see FIG. 3) is acquired independently of the occurring frequency during the time $t_{onmin*}$ during which a pulse signal is adjacent at the output Q of the monoflop MF. This setting signal $U_{c1}$ influences the output frequency of the clock generator (VCO). In the overload or light load case, the following control loop as illustrated in the block circuit diagram of FIG. 1 provides: $t_{on} \leq t_{onmin*}$; the detector reduces the oscillator frequency; and the effective pulse-duty factor $t_{on}/T_{neu}$ becomes smaller.

In this operating phase, the converter is operated with constant on time $t_{on}$ but with variable frequency. The operating mode of the detector circuit D is reproduced in FIG. 2 with reference to pulse diagrams and is explained on the basis of the circuit structure shown in FIG. 3. In case of overload, the detector circuit D recognizes the operating point of the converter from which the output current begins to rise in uncontrolled fashion.

The rise of the output current occurs at the minimum possible on time $t_{onmin}$ since the pulse-duty factor can no longer be decreased because of the delay times. The detector circuit D prevents the converter from reaching this shortest possible on time $t_{onmin}$. The current on time $t_{on}$ is measured. When the on time $t_{on}$ approaches the minimum possible on time $t_{onmin}$, the on time of the electronic switch S is held constant and the operating frequency of the clock generator (VCO) is lowered to $f_{neu}=1/T_{neu}$. The effective pulse-duty factor $t_{on}/T_{neu}$ is thus reduced without having to shorten the on time $t_{on}$. The constant on time $t_{onmin*}$ of the MF preferably lies slightly above $t_{onmin}$. The ratio $t_{on}/t_{onmin*}$ of the current on duration $t_{on}$ to the defined minimum on duration $t_{onmin*}$ is converted into a voltage proportional to the pulse-duty factor.

Figures 2A, 2B, 2C, 2D, 2E:
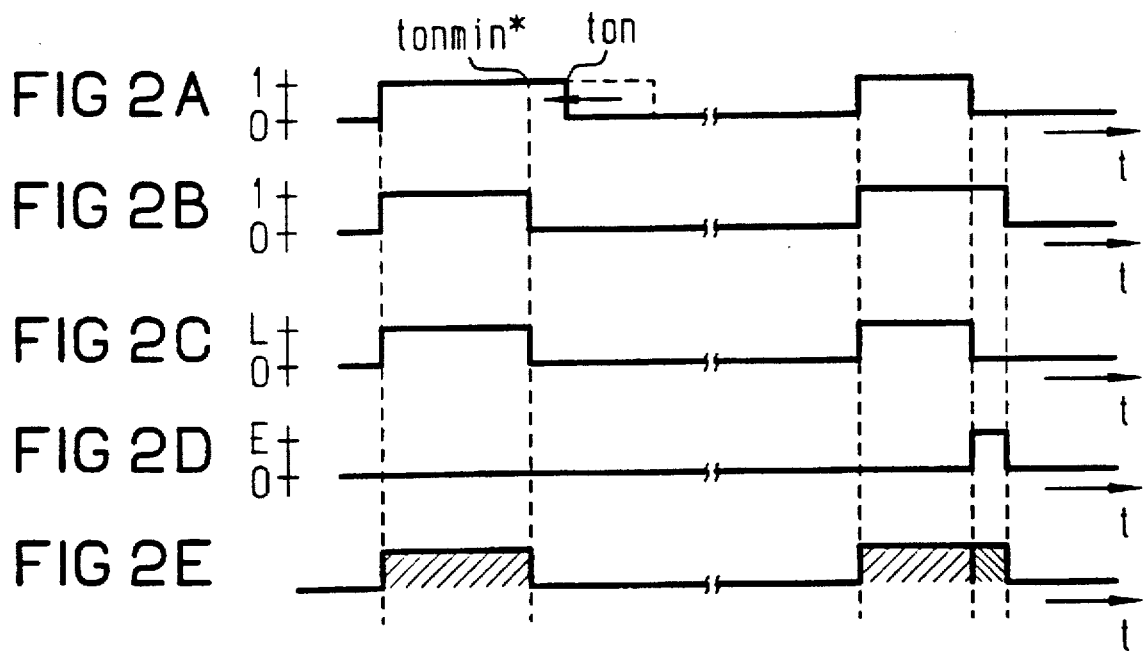
FIG. 2a-2f are pulse diagrams illustrating the operating mode of a detector circuit illustrated in FIG. 1.
Figure 2F:
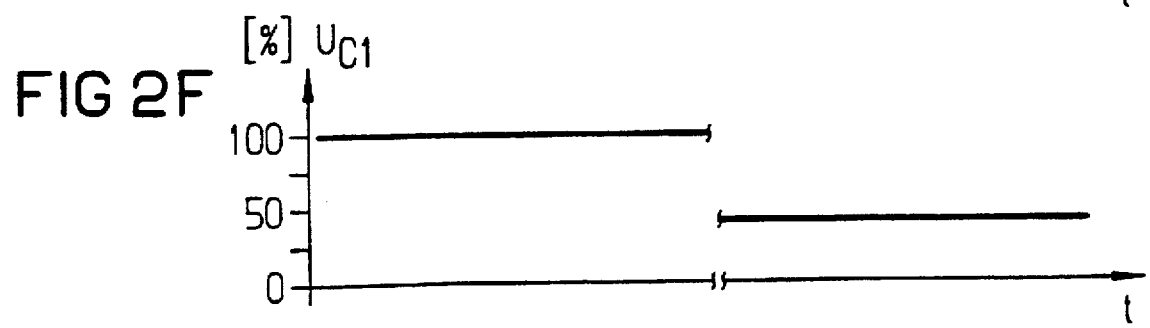

FIG. 2 shows pulse diagrams 2a through 2f for explaining the circuit arrangement shown in FIG. 1 with additional reference to FIG. 3. The drive signal $t_{on}$ is shown in FIG. 2A. This signal is correspondingly pulse-width modulated by the pulse-width modulator PWM, controlling the electronic switch of the converter circuit. FIG. 2b shows the output signal of the monostable circuit MF. Due to an increasing overload or disappearing load at the output of the converter, the on time $t_{on}$ or the pulse width of the drive signal is constantly reduced. The frequency of the clock generator is reduced from a specific point in time, $t_{on} \leq t_{onmin*}$ here.

FIG. 2C shows the charging time and FIG. 2D shows the discharging time of a capacitor C1 arranged in the comparator V of the detector circuit D. As indicated in FIG. 2D, the capacitor C1 is discharged when the pulse width of the drive signal falls below the pulse width of the output signal output by the monoflop MF. The logic of the detector circuit D is also reproduced in a certain way in FIG. 2E. When the pulse width $t_{on}$ of the drive signal is greater than the pulse width $t_{onmin*}$ of the monoflop MF, then the charge of the capacitor C1 is held during the "low" signal at the output of the monoflop MF. When the pulse width of the drive signal becomes smaller than the pulse width of the monoflop MF, then the charging time of the capacitor is correspondingly shortened. The capacitor C1 discharges during the time difference $t_{onmin*}-t_{on}$ (see FIG. 2D). The maximum possible voltage via R1 is adjacent at the capacitor C1 during the charging phase. The capacitor C1 is correspondingly discharged via R2 when the pulse duration of the monoflop MF falls below the pulse duration of the drive signal. The voltage $U_{C1}$ (see FIG. 3) controlling the clock generator (VCO) respectively corresponds to the ratio of the pulse widths $t_{onmin*}$ to $t_{on}$.

FIG. 3 shows a circuit-oriented realization of the detector circuit D. It is composed of the monoflop MF and the synchronous averaging unit V. The drive signal $t_{on}$ output by the pulse-width modulator PWM is adjacent at the input of the detector D, the terminal posts referenced E. The setting signal $U_{C1}$ for the clock generator (VCO) is taken at the capacitor C1. The monostable circuit MF is simultaneously triggered with the leading edge of the drive signal from the input E. The monostable circuit MF outputs a pulse having a defined pulse width at its output Q. For example, the transistor T1 is inhibited during the high potential of the pulse. The charging circuit for the capacitor C1 is charged by the operating potential source referenced $U_h$ via the resistor R1 and the diode D2. When the pulse width of the drive signal falls below the pulse width of the pulse output by the monoflop MF, then the capacitor C1 is discharged. This discharging occurs via the diode D2, the resistor R2 and the diode D3.

The transistor is activated to be conducting when low potential is provided at the output Q of the monoflop MF. Blocking voltage is adjacent to the diode D3 in the conductive condition of the transistor T1 and the capacitor C1 can no longer discharge. This discharging of the capacitor C1 only occurs during the duration of the positive output pulse of the monoflop MF after the conclusion of the positive condition of the drive signal. At all other times, the average capacitor charge $U_{C1}$ is held. The voltage at the capacitor C1 is equal to $v \times t_{on}/t_{onmin*}$. The proportional gain v and, thus, the slope of the control characteristic are dependent on the charging or discharging resistors R1 and R2.

FIG. 4 shows the curves referenced a,b. The curve referenced a occurs when, for instance, with a low-impedance short. The pulse duration of the drive signal must approach zero, but this is not possible because of the technologically caused signal running times, and the output current continues to increase. The functioning of the detector circuit D and the output characteristic of a converter of the present invention to be achieved therewith are shown by the curve referenced b.

Figure 5A:
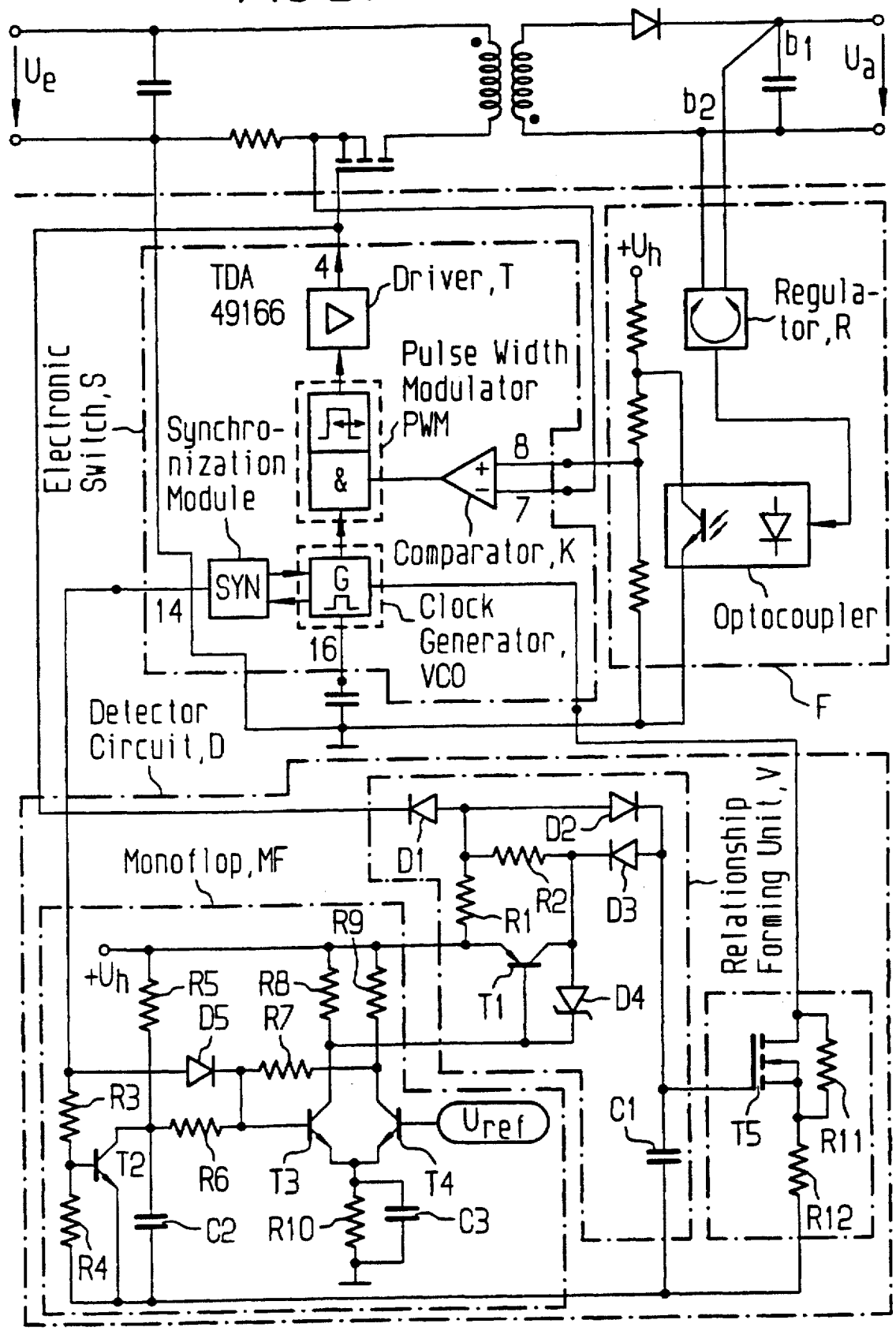
FIG. 5a is a circuit diagram of an embodiment of the present invention in combination with a control module.

FIG. 5a shows a circuit arrangement in combination with a control module TDA4916G of Siemens AG. A control circuit S (TDA4916G) serves for the control of the electronic switch of the converter circuit C. The electronic switch has a control electrode connected to a control output 4 of the control circuit S. A regulator R is connected to outputs b1, b2 of the converter. An opto-coupler whose photodiode is connected to the regulator R is arranged between the regulator R and the control circuit S. The phototransistor of the opto-coupler lies at reference potential at the emitter side. The control circuit S also contains the clock generator (expanded by the wiring to the voltage-controlled oscillator VCO) having an output. An arrangement composed of a logic arrangement and the pulse-width modulator is connected to this output. This arrangement is controlled by a comparator K. A driver T lies between the output of the pulse-width modulator and the gate electrode of the electronic switch. This driver T outputs drive pulses with variable pulse-duty factor at its output to the gate electrode of the electronic switch. Further, a synchronization module SYN that influences the clock generator is present in the control circuit S.

As shown in FIG. 5A, the monoflop MF provided for the circuit arrangement D for generating the time $t_{onmin*}$ is realized with the components R3, R4, R5, T2 and C2. A "high" signal at the output 14 of the control circuit S drives the transistor T2 via the level matching R3 and R4, as a result whereof C2 can discharge. The potential at the capacitor C2 amounts to about 0 volts after the discharging and thus represents a defined starting value for the subsequent charging during the time $t_{onmin*}$. As soon as the signal at the output 14 of the control circuit S carries a "low" potential, the transistor T2 is inhibited so that it is non-conducting and C2 can charge via R5. The voltage potential at the capacitor C2 is compared to a reference voltage source $U_{Ref}$ via a differential amplifier composed of R8, R9, R10, T3 and T4. The differential amplifier can also be implemented as an operational amplifier or comparator. The reference voltage source $U_{Ref}$ can likewise be arranged in the control module S. The synchronous averaging unit V, composed of R1, R2, D1, D2, D3, T1 and C1, as described under FIG. 3, can operate only as long as the potential at the capacitor C2 is smaller than the reference voltage $U_{Ref}$.

The resistor R7 effects a co-coupling of the differential amplifier and thus enables shorter switching times. The switching behavior is improved even more by C3 or an anti-saturation diode D4. When the voltage potential at C2 reaches the height of the reference voltage, then the transistor T3 through-connects the differential amplifier and transistor T1 is likewise activated to conduct. As a result, the capacitor C1 of the synchronous averaging unit V can no longer discharge. The circuit thus images the relationship $V \bullet t_{on}/t_{onmin*}$ at the capacitor C1. The gain factor V can be set by the dimensioning of R1 and R2. The setting signal acquired at C1 controls a final control element T5 that determines the operating frequency of the control module S.

Case 1:

$t_{on} > t_{onmin*}$

Voltage at C1≈voltage of the operating potential Uh—the transistor T5 is driven, i.e. R11 is shorted and the resistor R12 determines the "normal", fixed operating frequency of the converter circuit C.

Case 2:

$t_{on} < t_{onmin*}$

The voltage at the capacitor C1 is reduced in the ratio $V \bullet t_{on}/t_{onmin*}$, as a result whereof T5 becomes active. The resistor $R12+(R11//R_{ds})$ responsible for the frequency is boosted, and as a result, the operating frequency of the control module S is reduced.

Figure 5B:
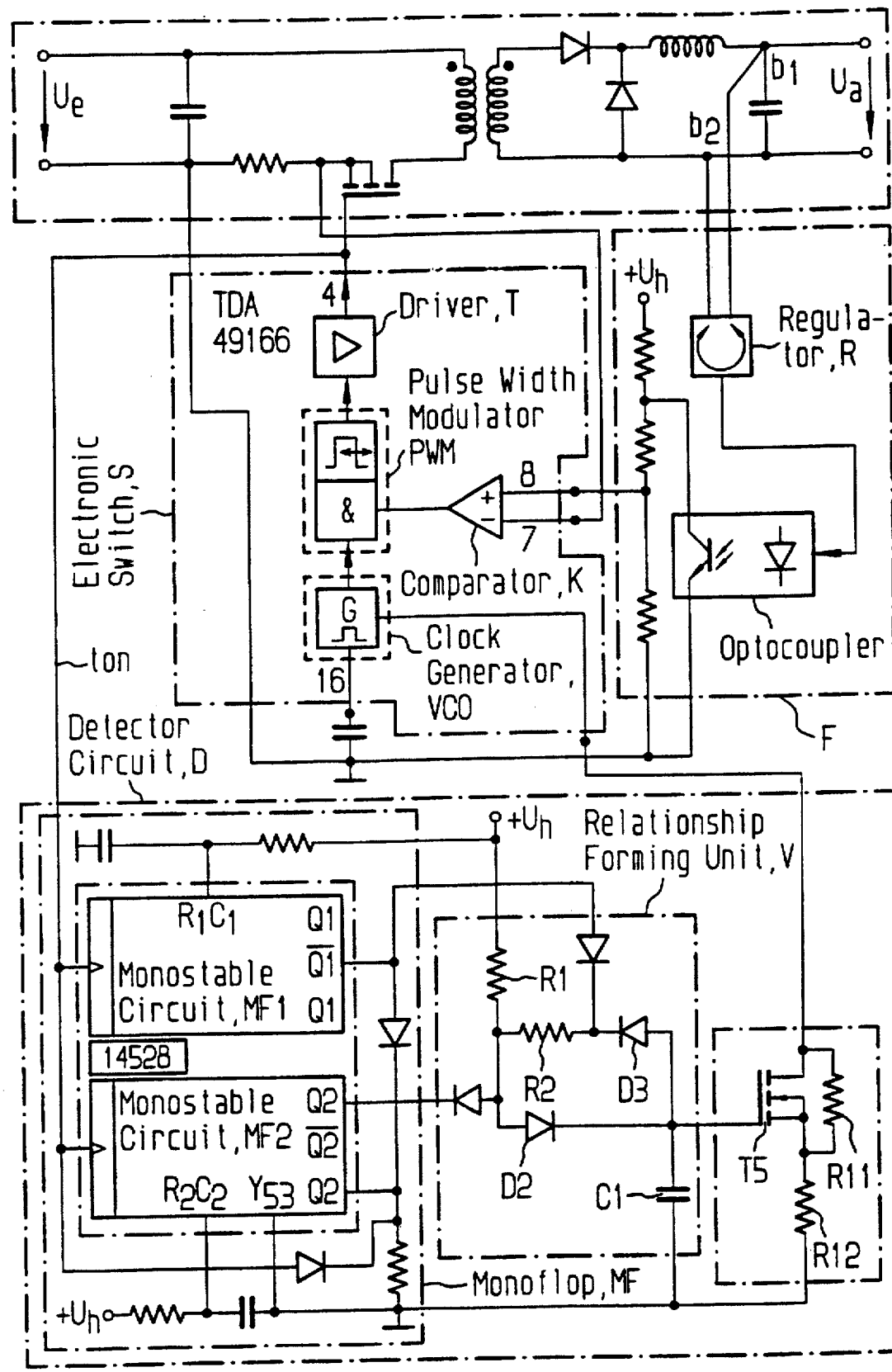
FIG. 5b is another embodiment of a circuit block diagram of the present invention of FIG. 1.

FIG. 5b shows a further embodiment of the block circuit diagram shown in FIG. 1. The function of the circuit arrangement shown in FIG. 5b corresponds to the function of the circuit arrangement shown in 5a, whereby the discretely constructed monostable circuit MF is replaced by an integrated circuit (IC14528), two independent monostable circuits MF1, MF2 here. Fundamentally, one monostable circuit suffices for the function of the circuit. The integrated circuit (IC14528), however, causes a switching delay of the drive signal for the synchronous averaging unit V. In order to compensate this switching delay, the second monostable circuit MF2 is employed for pulse editing in this integrated circuit.

Figure 6A:
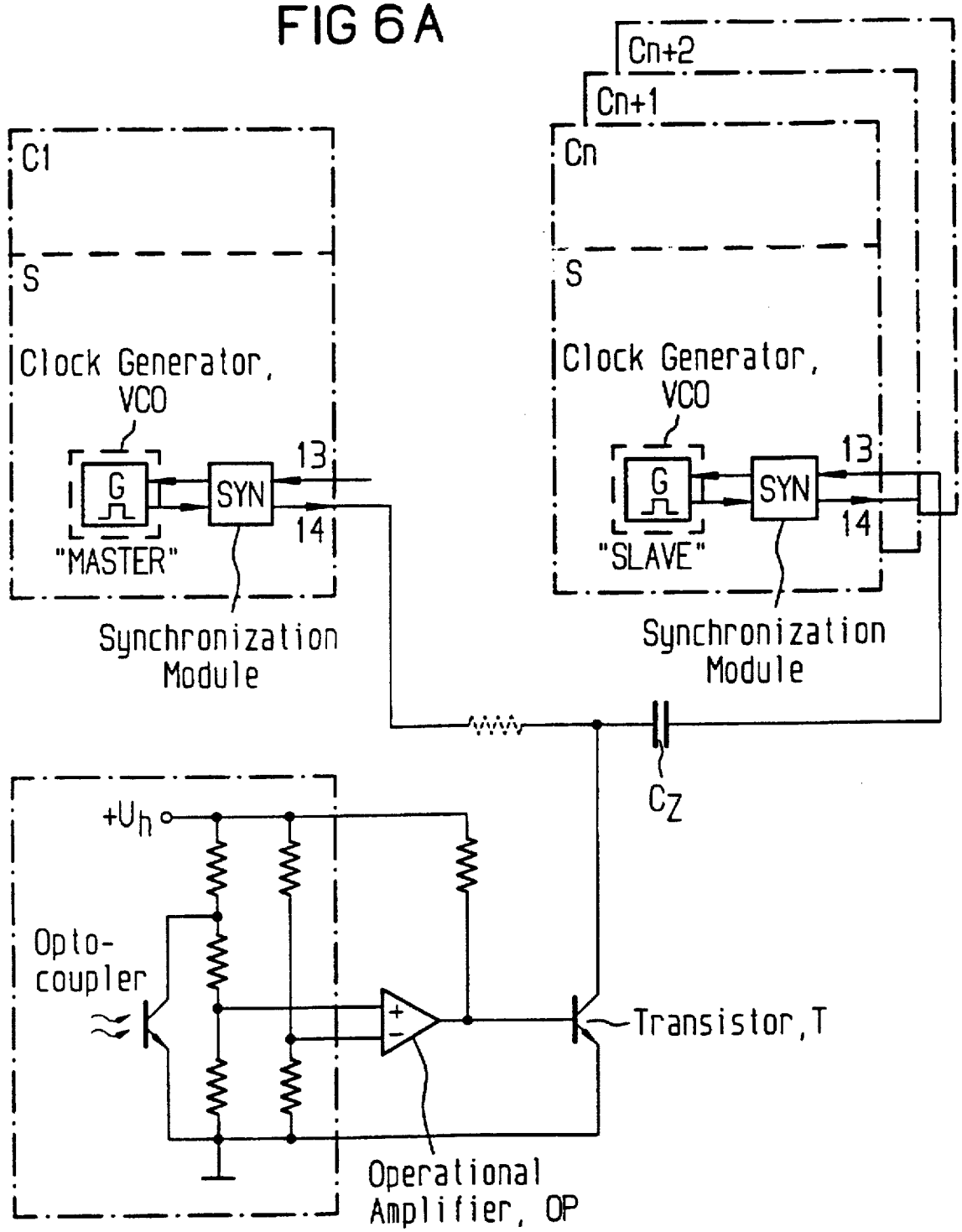
FIG. 6a is a block circuit diagram of an embodiment of the present invention wherein a plurality of converters work synchronously.

FIG. 6a shows a circuit arrangement wherein a plurality of converters C1, . . . .Cn work synchronously. When one of the converters (Cn here)switches from constant-frequency to variable-frequency operation, this must be decoupled from the common synchronization.

Figure 6B:
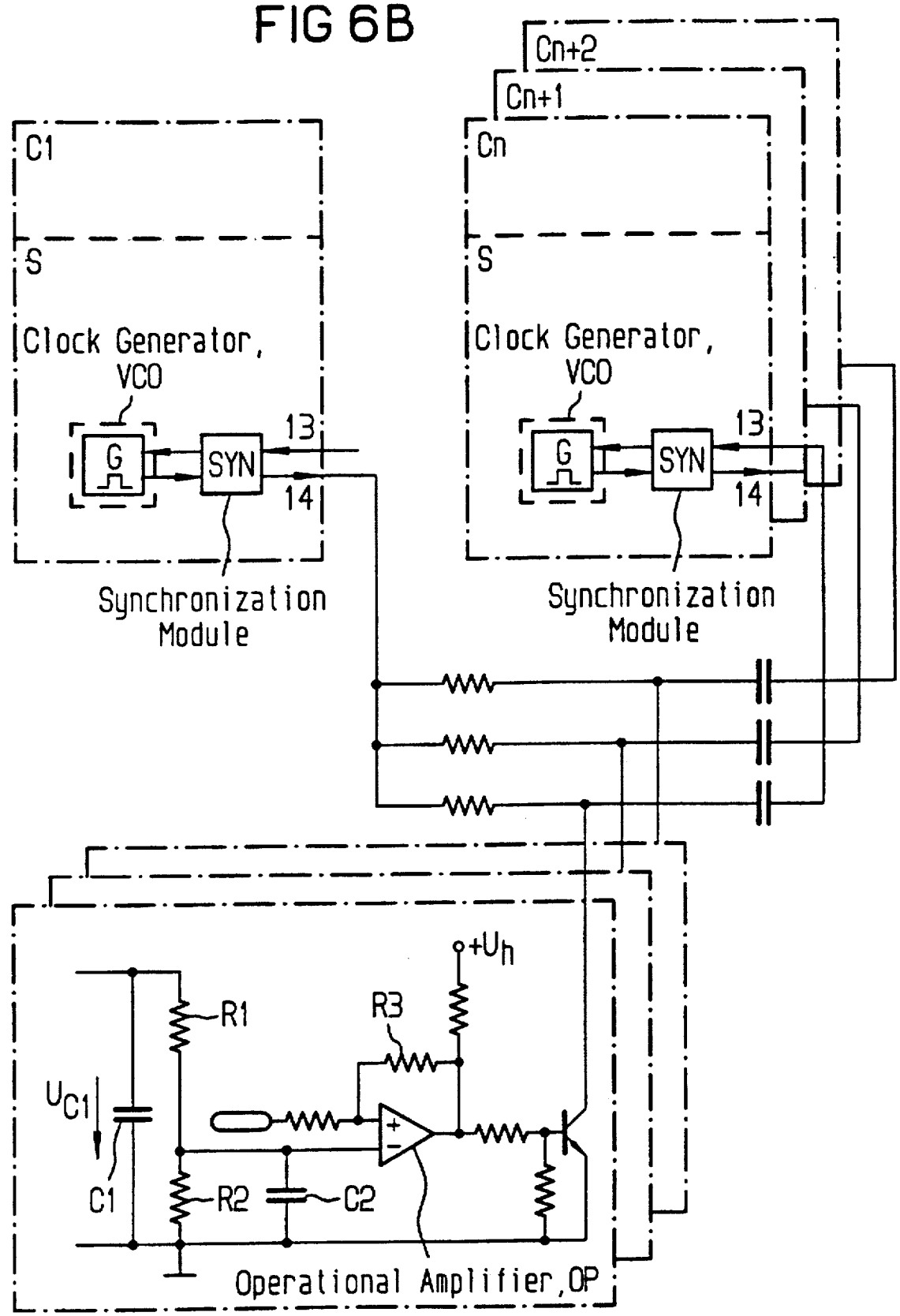
FIG. 6b is another block circuit diagram illustrating an embodiment of a plurality of converters working synchronously.

FIG. 6a, 6b show two exemplary embodiments for this. In the circuit arrangement shown in FIG. 6a, the synchronization is interrupted upon activation of the current limitation. The synchronization clock is capacitatively coupled to the input 13 of the control module. When the output of the "slave" is loaded to such an extent that the current limitation of the converter kicks in, then the operational amplifier OP switches its output to high potential and the transistor T is driven. The synchronization pulses arriving from the master are thus decoupled from the "slave", as a result whereof it works unsynchronized and can reduce its operating frequency corresponding to a variable-converter if the output current continues to rise. The converter operates unsynchronized after the cut-in of the current limitation. If one wishes to achieve that the synchronization of the converter is left only upon cut-in of the inventive circuit, then a circuit as shown in FIG. 6b can be used. The operational amplifier OP checks the setting signal at the capacitor C1 and compares it to a reference voltage $U_{ref}$. The resistors R1, R2 are responsible for the level matching or for a further smoothing of the signal in combination with the capacitor C2 as well. The resistor R3 effects a co-coupling in order to assure a hysteresis between the synchronous and non-synchronous operation of the converter. Since the setting signal $U_{C1}$ at the capacitor C1 does not change until the cut-in of the above-described circuit, the switch from constant-frequency to variable-frequency operation only occurs as soon as this is necessary for the "correct" function of the circuit.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A converter apparatus, comprising:

a converter circuit having a clock frequency;

a pulse-width modulator producing a drive signal output, wherein the duration of pulses of the drive signal output is variable with respect to at least one controlled quantity;

a voltage-controlled oscillator connected with the pulse-width modulator, wherein the clock of the converter circuit can be regulated by the voltage-controlled oscillator;

a synchronous averaging unit having an output connected to the voltage controlled oscillator and having a first input and a second input, wherein a comparison pulse of constant duration triggered by the leading edge of the drive signal is supplied to the first input and the drive signal output by the pulse-width modulator is supplied to the second input so that when an identical or shorter pulse duration of the drive signal as compared to the comparison pulse is present, the synchronous averaging unit provides a voltage potential setting signal via the output to lower an output frequency of the voltage-controlled oscillator to regulate the clock frequency of the converter circuit.

2. The converter apparatus according to claim 1, further comprising:

a monostable circuit means for generating a pulse connected with the second input of the synchronous averaging unit, whereby the duration of the comparison pulse is above the minimum pulse of the drive signal that can be output by the pulse-width modulator.

3. The converter apparatus according to claim 2, further comprising:

an output of the monostable circuit means connected to a base of a transistor via a first resistor;

a second resistor having a first end and a second end, the first end connected to an emitter of the transistor;

a first operating potential voltage connected to the monostable circuit;

a third resistor having a first terminal and a second terminal, the first terminal connected to a collector of the transistor;

a first diode having a cathode connected to the collector of the transistor and to the first terminal of the third resistor;

a second diode having a cathode and an anode;

a capacitor having a first end and a second end, the first end connected to the anode of the first diode and to the cathode of the second diode;

a third diode having a cathode and an anode, the anode of the third diode connected to the second terminal of the second resistor and to the anode of the second diode and to the second terminal of the third resistor;

a circuit input connected to the cathode of the third diode and to a trigger input of the monostable circuit means; and a second operating potential voltage corresponding to a ground potential connected to the second end of the capacitor and to the monostable circuit means.

4. The converter apparatus according to claim 1, wherein the drive signal output by the pulse-width modulator comprises a pulse of unchanging minimum duration when a short-circuit or no-load condition exists.

5. The converter apparatus according to claim 1, further comprising:

a plurality of the frequency converter circuits driven by a master clock generator via a synchronization unit;

wherein each averaging unit of each converter circuit is followed by a comparison unit, whereby the voltage potential output of the setting signal by the averaging unit is compared to a reference voltage potential in the comparison unit, and the converter circuit is decoupled from the master clock generator given a short-circuit or no-load condition.

* * * * *